(12) United States Patent
Yajima et al.

(10) Patent No.: US 7,116,016 B2
(45) Date of Patent: Oct. 3, 2006

(54) LINEAR ACTUATOR CAPABLE OF LOW-SPEED DRIVING

(75) Inventors: Hisashi Yajima, Ibaraki (JP); Nobuhiro Fujiwara, Ibaraki (JP); Satoru Itou, Ibaraki (JP)

(73) Assignee: SMC Corporation, Tokyo (JP)

( * ) Notice: Subject to any disclaimer, the term of this patent is extended or adjusted under 35 U.S.C. 154(b) by 57 days.

(21) Appl. No.: 10/890,561

(22) Filed: Jul. 12, 2004

(65) Prior Publication Data

US 2005/0012405 A1 Jan. 20, 2005

(30) Foreign Application Priority Data

Jul. 18, 2003 (JP) .............................. 2003-276810

(51) Int. Cl.
*H01F 7/16* (2006.01)
(52) U.S. Cl. .............................. 310/12; 310/14; 310/15
(58) Field of Classification Search .................. 310/12, 310/14, 15
See application file for complete search history.

(56) References Cited

U.S. PATENT DOCUMENTS

| 5,440,183 A * | 8/1995 | Denne ........................... 310/12 |
| 6,433,447 B1 * | 8/2002 | Kitazawa et al. .............. 310/12 |
| 6,879,064 B1 * | 4/2005 | Kobayashi et al. ............ 310/12 |

FOREIGN PATENT DOCUMENTS

| JP | 2001-023818 | 1/2001 |
| JP | 2001-023818 A | 1/2001 |

* cited by examiner

*Primary Examiner*—Darren Schuberg
*Assistant Examiner*—Iraj A. Mohandesi
(74) *Attorney, Agent, or Firm*—Hisako Muramatsu, Esq.

(57) ABSTRACT

Disclosed herein is a simple, inexpensive linear actuator which is capable of controlling the displacement of the movable body by regulating the amount of electric energy applied without the necessity of detecting the displacement of the movable body with a displacement sensor or controlling the displacement of the movable body by feedback control in response to the detected value.

The linear actuator comprises an electromagnetic unit which generates magnetic force in response to the amount of electric energy applied, a movable body which is displaced linearly by magnetic force as thrust force which is supplied from the electromagnetic unit, a spring means which applies a spring force to the movable body in the direction opposite to the direction of said thrust force, and a control apparatus which controls the amount of electric energy to be applied to said electromagnetic unit, wherein said control apparatus is so constructed as to control the rate of displacement of said movable body in response to the amount of electric energy applied, with voltage or current applied to said electromagnetic unit varying from that which generates a thrust force balancing with said spring force.

2 Claims, 6 Drawing Sheets

LINEAR ACTUATOR CAPABLE OF LOW-SPEED DRIVING

BACKGROUND OF THE INVENTION

1. Field of the Invention

The present invention relates to a linear actuator which displaces a movable body linearly with electromagnetic force. More specifically, the present invention relates to a linear actuator capable of driving said movable body at low seeds.

2. Description of the Related Art

There has long been known a linear actuator which drives a load by displacing a movable body linearly with electromagnetic force. The linear actuator of this type usually consists of an exciting coil, a core which generates electromagnetic force when the exciting coil is energized, and a movable body which is displaced by electromagnetic force as thrust force which is supplied from said core.

The linear actuator mentioned above is usually so constructed as to be driven with a large thrust force in order that said movable body is displaced surely and stably against load and sliding resistance. Consequently, said movable body moves at a high speed and produces noise when it collides violently against the stroke end. One way to reduce noise was by using a rubber damper which absorbs shocks to the movable body. However, this poses a problem with durability and dusting.

There have been proposed several techniques to address the above-mentioned problem by controlling the driving speed of said linear actuator. For example, Patent Document 1 discloses a method for controlling the driving speed by detecting how the movable piece of the linear motor changes with time in stroke and speed with the help of a measuring apparatus (displacement sensor), comparing the detected data with a characteristic curve which has previously been established in a control apparatus, and regulating the target of electric energy according to the difference between the detected value and the characteristic curve. However, this method needs a displacement sensor and a complex control circuit, which inevitably makes the actuator larger and the control unit more complex. Patent Document 1: Japanese Patent Laid-open No. 2001-23818

OBJECT AND SUMMARY OF THE INVENTION

It is an object of the present invention to provide a simple, inexpensive linear actuator which is capable of controlling the displacement of the movable body by regulating the amount of electric energy applied without the necessity of detecting the displacement of the movable body with a displacement sensor or controlling the displacement of the movable body by feedback control in response to the detected value.

The present invention completed to address the above-mentioned problem covers a linear actuator capable of low-speed driving which comprises an electromagnetic unit which generates magnetic force in response to the amount of electric energy applied, a movable body which is displaced linearly by magnetic force as thrust force which is supplied from the electromagnetic unit, a spring means which applies a spring force to the movable body in the direction opposite to the direction of said thrust force, and a control apparatus which controls the amount of electric energy to be applied to said electromagnetic unit, wherein said control apparatus is so constructed as to control the rate of displacement of said movable body in response to the amount of electric energy applied, with voltage or current applied to said electromagnetic unit varying from that which generates a thrust force balancing with said spring force.

The present invention is embodied also in a linear actuator, in which said electromagnetic unit consists of an exciting coil and a core which generates magnetic force as said exciting coil is energized, such that said movable body made of a magnetic material is displaced by the magnetic force generated by said core, and said spring means is a mechanical spring.

The present invention is embodied also in a linear actuator, in which said electromagnetic unit is constructed of an exciting coil and a core which generates magnetic force upon application of electric energy to said exciting coil, such that said movable body made of a permanent magnet is displaced by interaction between the magnetic force of the permanent magnet and the magnetic force generated by said core, and said spring means is a magnetic spring working with magnetic force existing between said permanent magnet and the core.

The present invention is embodied also in a linear actuator which comprises an electromagnetic unit which generates magnetic force in response to the amount of electric energy applied, a movable body which is displaced linearly by magnetic force as thrust force which is supplied from the electromagnetic unit, a spring means which applies a spring force to the movable body in the direction opposite to the direction of said thrust force, and a control apparatus which controls the amount of electric energy to be applied to said electromagnetic unit, wherein said electromagnetic unit consists of a core and an exciting coil, said core having a columnar inner core forming an inner pole, an outer core forming an outer pole surrounding said inner core, and a space formed between the two cores, said exciting coil being arranged in the space of said core and around said inner core; said movable body consists of an annular permanent magnet having radially magnetized N-pole and S-pole and is so arranged as to be displaced freely in the space of said core in the axial direction of the core; said spring means is a magnetic spring attributable to magnetic force existing between said permanent magnet and the core; and said control apparatus is so constructed as to control the rate of displacement of said movable body in response to the amount of electric energy applied, with voltage or current applied to said exciting coil varying from that which generates a thrust force balancing with said spring force. Incidentally, said movable body is held by a non-magnetic holder.

Thus, the present invention provides a simple, inexpensive linear actuator which is capable of controlling the displacement of the movable body by regulating the amount of electric energy applied without the necessity of detecting the displacement of the movable body with a displacement sensor or controlling the displacement of the movable body by feedback control in response to the detected value.

DESCRIPTION OF THE PREFERRED EMBODIMENTS

Figure 1:
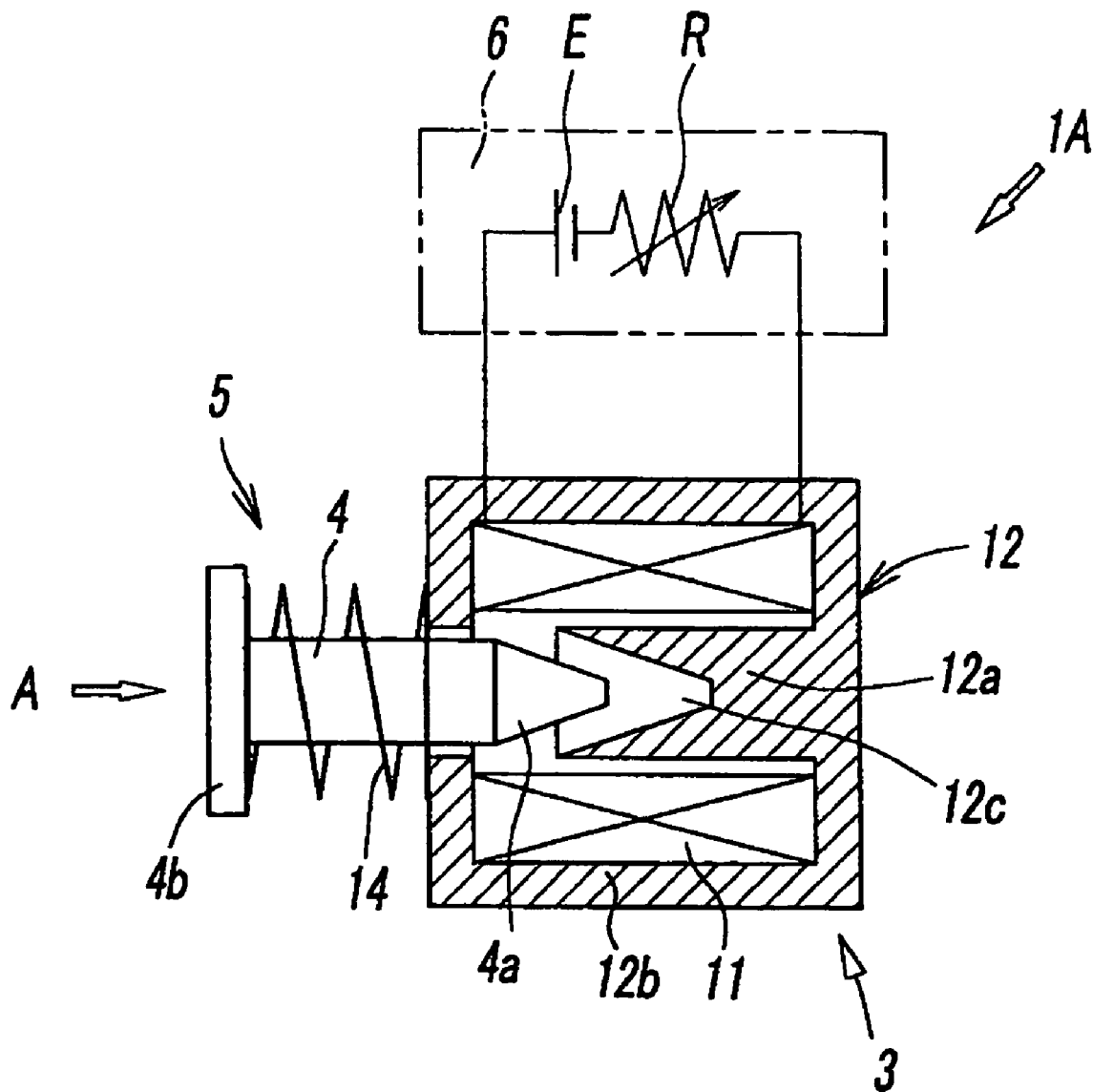
FIG. 1 is a schematic sectional view showing the linear actuator pertaining to the first embodiment of the present invention.

FIG. 1 is a schematic sectional view showing the linear actuator pertaining to the first embodiment of the present invention. The linear actuator 1A consists of an electromagnetic unit 3, which generates electromagnetic force in response to the amount of electric energy applied, a movable body 4, which is displaced linearly in the direction of arrow A by the magnetic thrust force produced by the electromagnetic unit 3, a spring means 5, which applies a force to the movable body 4 in the direction opposite to the direction A of the thrust force, and a control apparatus 6, which controls the displacement of the movable body 4 by regulating the amount of electric energy applied to the electromagnetic unit 3.

Said electromagnetic unit 3 consists of an exciting coil 11 and a core 12, which generates magnetic force as the exciting coil 11 is energized. The core 12 consists of an inner core 12a and an outer core 12b, which encloses the inner core 12a and said exciting coil 11. Said inner core 12a has an end 12c in which is formed a conical concave.

Said movable body 4 is a rod-like part. It has a conical base end 4a which is so tapered as to mate with the concave 12c of said inner core 12a, so that the conical end 4a is pulled to said concave 12c. The other end of said movable body 4 extends outward from said outer core 12b. There is provided a mechanical coil spring 14 (as said spring means 5) between said outer core 12b and the spring bearing 4b at one end of the movable body 4.

Said control apparatus 6 consists of a DC source E and a variable resistor R, so that it applies a DC voltage to said electromagnetic unit 3, which in turn generates a thrust force that balances with the spring force of said spring means 5. Said variable resistor R varies the voltage or current automatically according to the previously established value, so that said movable body 4 is displaced at a speed corresponding to the amount of electric energy applied.

Figure 2:
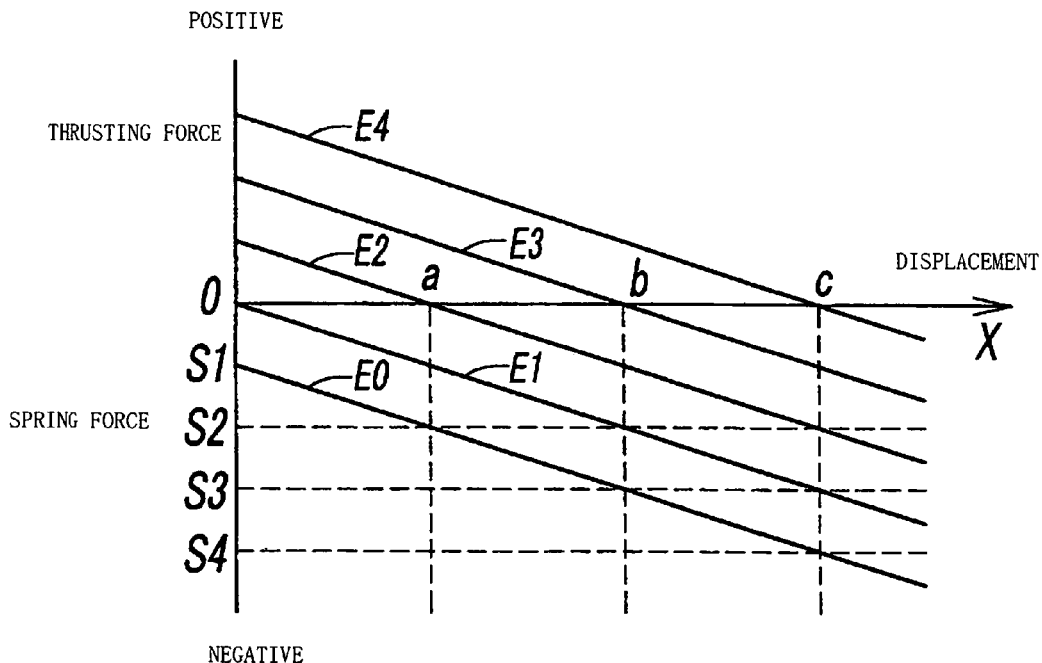
FIG. 2 is a diagram showing the thrust characteristics of the linear actuator shown in FIG. 1.

FIG. 2 is a diagram showing the characteristics of the thrust force. It represents relations among the displaced position of the movable body 4 of said actuator 1A, the spring force which is applied to said movable body 4 at each displaced position, and the amount of electric energy applied that generates the thrust force balancing with the spring force. It is assumed that the end of the movable body 4 is not displaced when no voltage is applied to the electromagnetic part 3. In this state, the spring force S1 acts on the movable body 4 in the direction opposite to the direction A of the thrusting force in which the movable body 4 is pushed in. E1 represents the voltage that generates the thrust force to balance with said spring force S1 while retaining said movable body 4 at the initial position without displacement. As said movable body 4 is displaced (in the pulling direction) to the point a, said spring 14 is compressed so that its spring force is S2. Thus, E2 represents the voltage that generates the thrust force to balance with the spring force S2. As said movable body 4 is displaced to the point b, said spring force becomes S3. Thus, E3 represents the voltage that generates the thrust force to balance with the spring force S3. Further, as said movable body 4 is displaced to the point c, said spring force becomes S4. Thus, E4 represents the voltage that generates the thrust force to balance with the spring force S4.

Incidentally, in this example, the voltage is varied; however, the same result will be produced when the current is varied.

Figure 3:
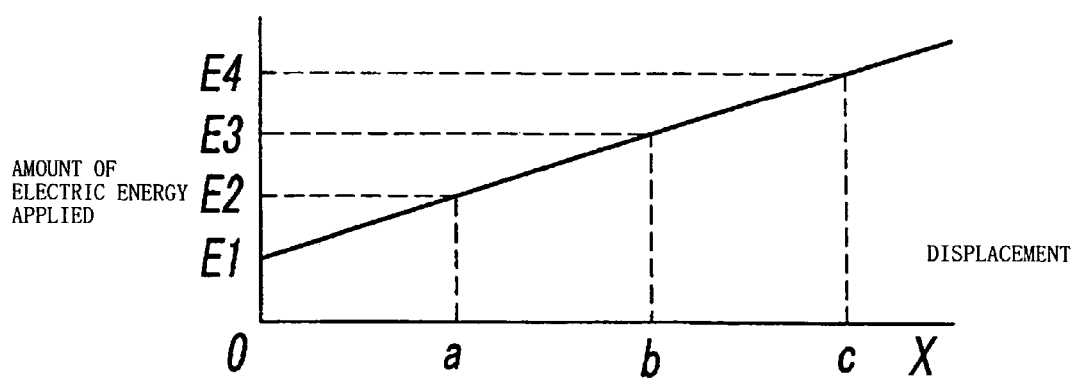
FIG. 3 is a diagram showing the relation between the displacement of the movable body and the amount of electric energy applied in the case where the linear actuator is controlled according to the thrust characteristics shown in FIG. 2.
Figure 4:
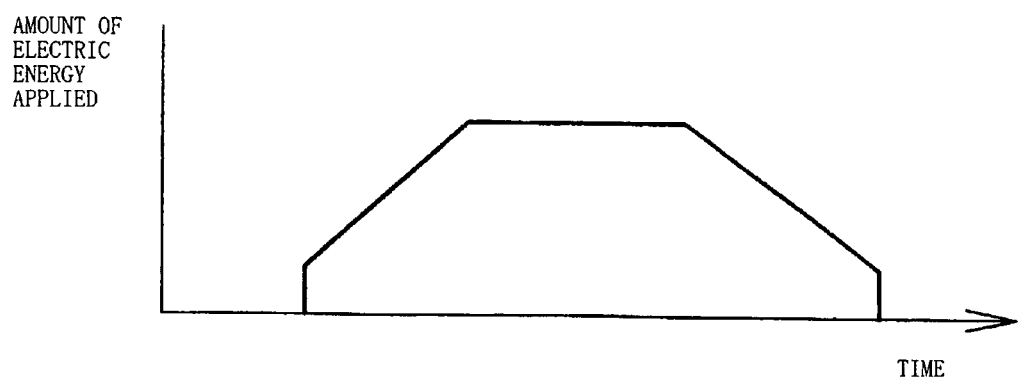
FIG. 4 is a diagram showing the waveform of current application for control performed as shown in FIG. 3.
Figure 5:
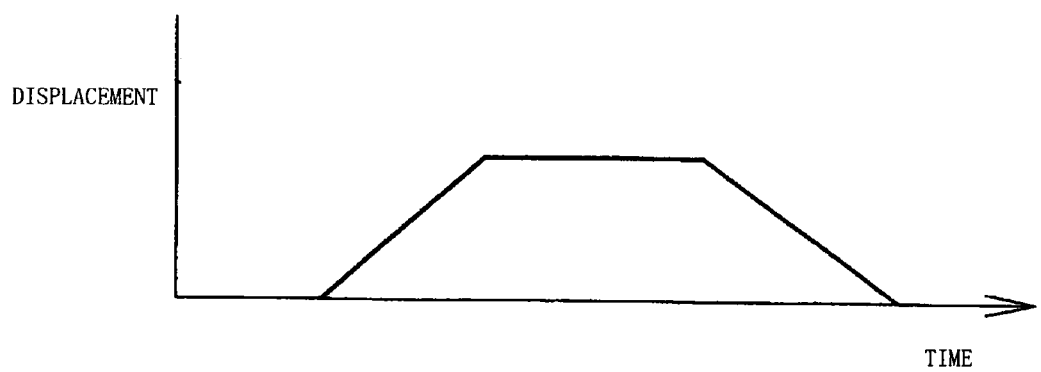
FIG. 5 is a diagram showing the change with time of the displacement of the movable body in the case where control is performed according to the wave form of current application as shown in FIG. 4.

With the above-mentioned characteristics of thrust force, the displacement of the movable body 4 is proportional to the voltage applied, as shown in FIG. 3. In other words, when no voltage is applied to the electromagnetic unit 3 (or the voltage applied is E0), said movable body 4 is at the end of the outward stroke and said spring force S1 acts in the negative (outward) direction. As the voltage is gradually applied to the electromagnetic unit 3, the thrust force acts on said movable body 4 in the direction of arrow A and the thrust force increases gradually. When the voltage reaches E1, the thrust force acting on said movable body 4 balances with the spring force, with said movable body 4 being at rest without displacement. As the voltage is increased, the movable body 4 is displaced gradually in the direction of arrow A. When the voltage reaches E2, said movable body 4 reaches the position a. When the voltage reaches E3, the movable body 4 reaches the position b. When the voltage reaches E4, the movable body 4 reaches the position c. Therefore, if the voltage is varied along the waveform of voltage application as shown in FIG. 4, said movable body 4 is displaced at a rate corresponding to the voltage change, as shown in FIG. 5. In this case, if the voltage is varied slowly, the movable body 4 is displaced at a lower rate accordingly. Moreover, said movable body 4 can be stopped at any position corresponding to the voltage applied. This makes it possible to control the positioning by voltage application.

Figure 6:
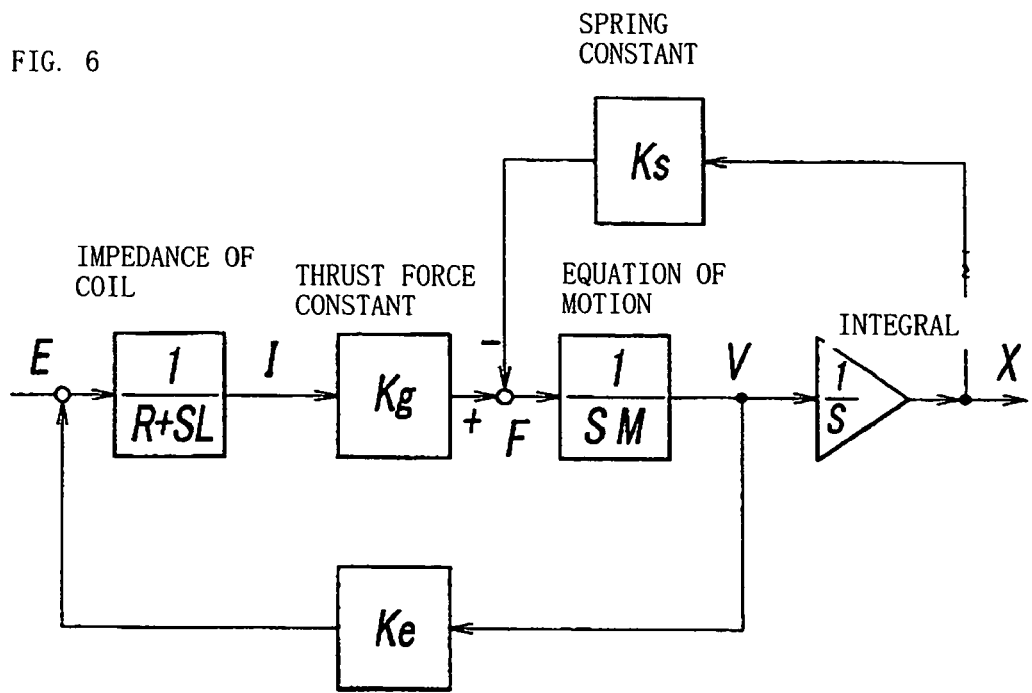
FIG. 6 is a block diagram showing the control system in the linear actuator shown in FIG. 1.
Figure 7:
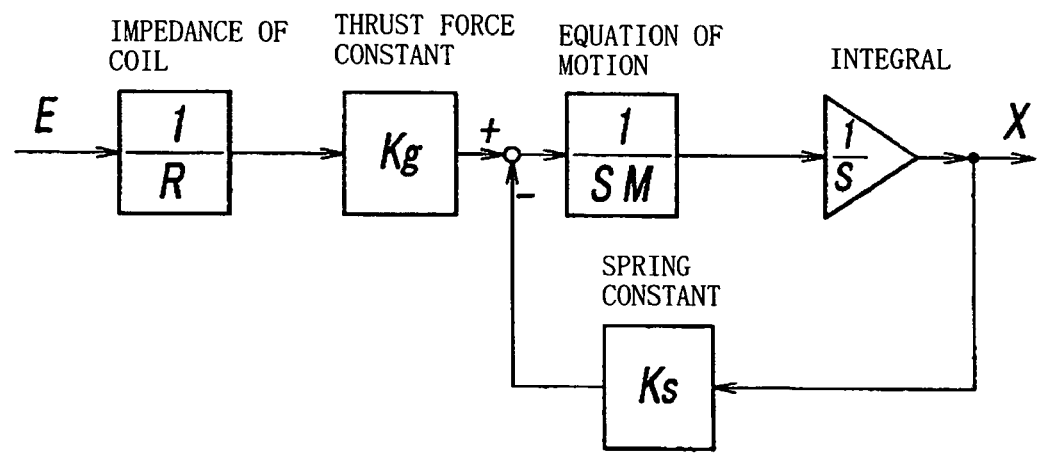
FIG. 7 is a block diagram showing the control system in the case where the linear actuator is displaced slowly.

Said control may be represented by the block diagram shown in FIG. 6. While the movable body 4 is being displaced slowly, $dE/dt \approx 0$ and $v \approx 0$ hold. This can be approximated by the block diagram shown in FIG. 7. In this case, the spring constant Ks functions in the same way as in displacement feedback control. It follows that pseudo-displacement feedback control takes place. Incidentally, in the present invention, it is not always necessary that the linear actuator have the completely linear characteristics as shown in FIGS. 2 and 3; however, it may have nonlinear characteristics.

Figure 8:
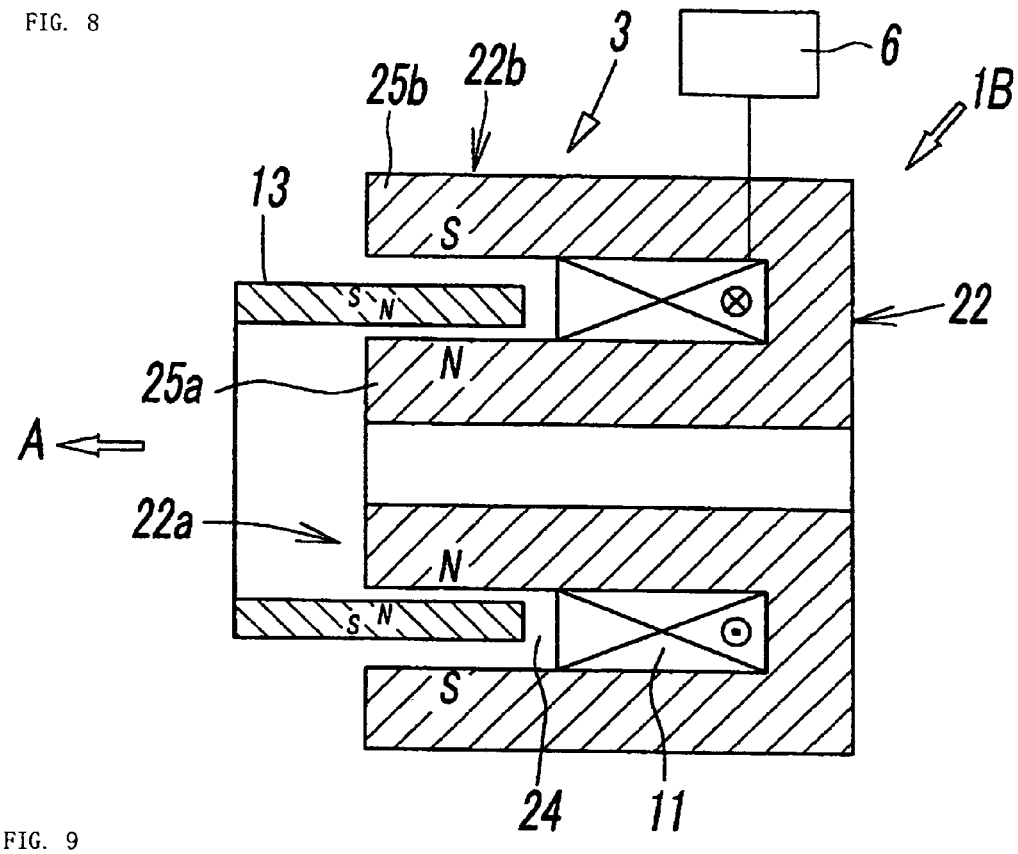
FIG. 8 is a schematic sectional view showing the linear actuator pertaining to the second embodiment of the present invention.

FIG. 8 illustrates the principle of the electromagnetic unit 3 used in the linear actuator 1B pertaining to the second embodiment of the present invention. The linear actuator 1B pertaining to the second embodiment differs from the linear actuator 1A pertaining to said first embodiment in that the movable body 13 consists of a permanent magnet so that it is displaced by the mutual action of the magnetic force of the permanent magnet and the magnetic force generated by the core 22 and that said mechanical spring is replaced by a magnetic spring which relies on magnetic force acting on said movable body 13 and the core 22.

Said core 22 of the electromagnetic unit 3 consists of a cylindrical inner core 22a forming an inner pole and a cylindrical outer core 22b forming an outer pole which surrounds said inner core 22. Between the two cores 22a and 22b is a circular space 24, in which is arranged a circular exciting coil 11 which surrounds the inner core 22a. In the circular space 22 is also arranged the cylindrical movable body 13 which is coaxial with the two cores 22a and 22b and is movable in the axial direction without contact with them.

Said movable body 13 consists of a permanent magnet, with its N-pole and S-pole magnetized in the radial direction. In the illustrated case, the N-pole is magnetized inside the movable body 13 and the S-pole is magnetized outside the movable body 13. The movable body 13 is held by a non-magnetic holder (not shown) and connected to an output shaft through this holder.

Said inner and outer cores 22a and 22b are longer than said exciting coil 11 (in the axial direction), so that their ends protrude from the exciting coil 11. The protruding parts form said inner and outer poles 25a and 25b. The outer surface of the inner pole 25a faces the inner surface of the movable body 13, and the inner surface of the outer pole 25b faces the outer surface of the movable body 13.

Said linear actuator 1B mentioned above works as follows. When the exciting coil 11 is not energized, said core 22 is not magnetized and hence both the inner pole 25a and the outer pole 25b do not generate magnetic force. Consequently, said movable body 13, which consists of a permanent magnet, is pulled toward the core 22 by its own magnetic force, so that its base end rests (at its home position) between the inner pole 25a and the outer pole 25b, as shown in FIG. 8. The magnetic force which the core 22 exerts on said movable body 13 is in the direction opposite to the direction (indicated by arrow A) in which said movable body 13 is displaced forward. This magnetic force is an elastic force, and hence the pulling force due to magnetism functions as a "magnetic spring".

With the movable body 13 at its home position, a DC voltage is applied to said exciting coil 11 in the direction indicated by the symbols shown in FIG. 8. The applied DC voltage turns the inner pole 25a and the outer pole 25b of the core 22 into the N-pole and the S-pole, respectively. As the result, a magnetic repulsive force occurs between said movable body 13 and said two poles 25a and 25b, and it pushes said movable body 13 in the direction of arrow A. The magnitude of the magnetic force that occurs in the poles 25a and 25b is proportional to the voltage applied. That is, the greater the voltage, the greater the magnetic force (hence the thrust force), and vice versa. Therefore, it is possible to control as desired the rate of displacement of the movable body 13 by varying the voltage applied. It is also possible to stop the movable body 13 at a position where the thrust force balances with the pulling force (acting as a magnetic spring) due to magnetism of the permanent magnet.

Incidentally, if the direction of current application is reversed (opposite to that shown in FIG. 8), the poles 25a and 25b generate magnetism in the opposite direction, so that they apply the thrust force to the movable body 13 in the opposite direction.

In the embodiment shown in FIG. 8, the inner and outer cores 22a and 22b of said core 22 and the movable body 13 have a round cross section. However, the cross section may be elliptic, rectangular, or any other polygonal.

Figure 9:
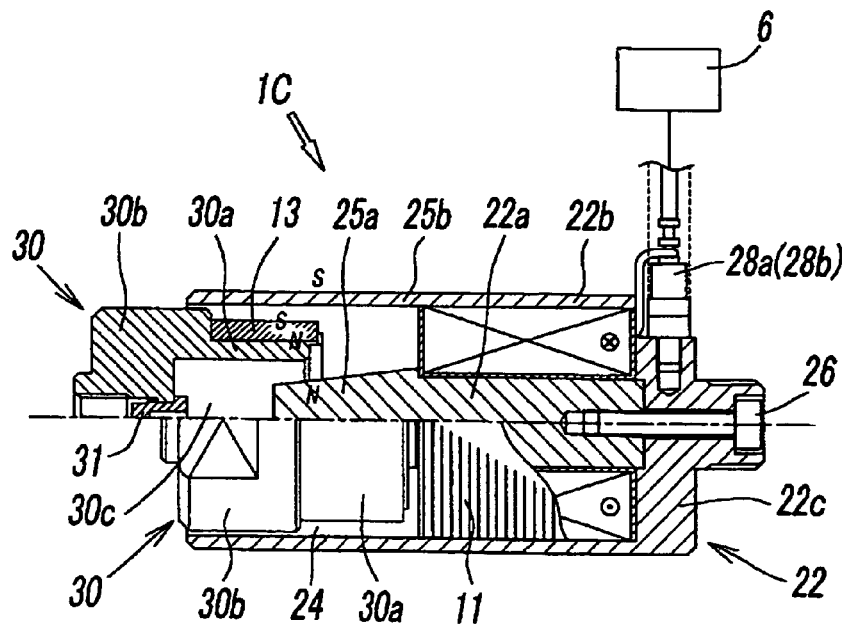
FIG. 9 is a sectional view showing the linear actuator pertaining to the third embodiment of the present invention.
Figure 10:
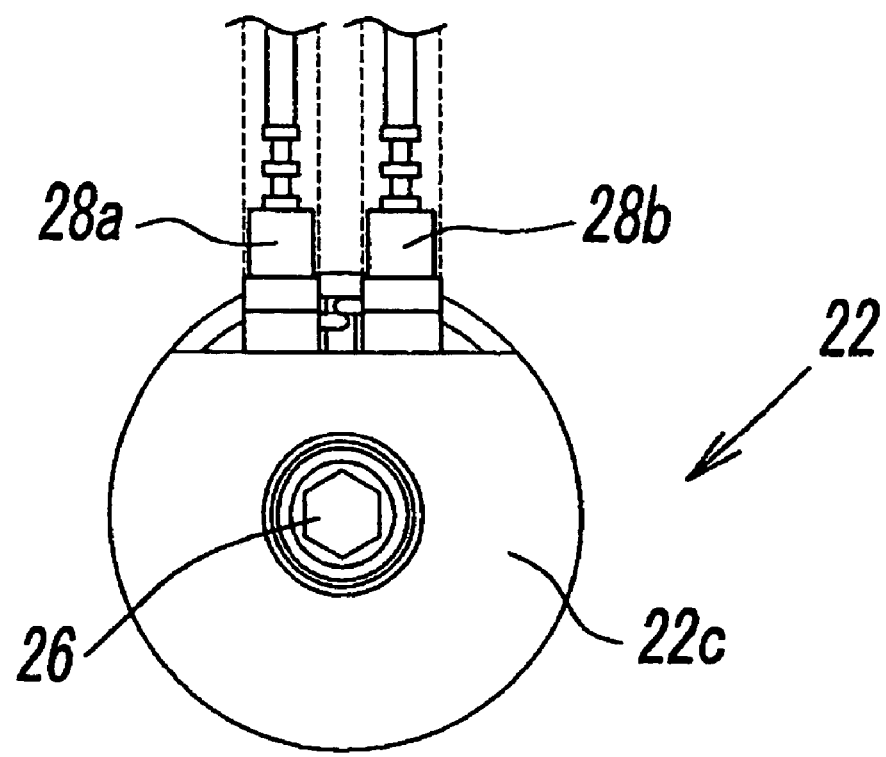
FIG. 10 is a side elevation of the linear actuator shown in FIG. 9.

FIGS. 9 and 10 show a linear actuator pertaining to the third embodiment of the present invention. This linear actuator 1C is based on the principle of the linear actuator 1B (shown in FIG. 8) pertaining to the second embodiment of the present invention. The linear actuator 1C has the core 22 which consists of an inner core 22a and an outer core 22b which are made of different materials and are joined together. Said outer core 22b has a cylindrical shape, whose base end is closed with an end wall 22c and whose forward end is open. Said inner core 22a has a cylindrical shape and is placed coaxially at the center of the inside of said outer core 22b, with its base end fixed to said end wall 22c with a bolt 26. The inner core 22a is slightly shorter than said outer core 22b and its forward end is tapered.

The end wall 22c of said outer core 22b is provided with a pair of coil terminals 28a and 28b, which are connected to an exciting coil 11 wound between said two cores 22a and 22b and also connected to the control unit 6.

The movable body 13, which consists of a permanent magnet, is held by a cylindrical holder 30. This holder 30 has a base end 30a into which said movable body 13 is fitted and a forward end 30b which is connected to an output shaft (not shown). The holder 30 is arranged coaxially in the space 24 between the inner and outer cores 22a and 22b of said core 22, so that it can be displaced in the axial direction. In addition, the holder 30 has an inner hole 30c into which the forward end of said inner core 22a fits. At the bottom of the inner hole 30c is an elastic damper 31 with which the forward end of said inner core 22a comes into contact.

In the case of the linear actuator 1C pertaining to the third embodiment, the displacement of the movable body 13 can be controlled in the same way as in the second embodiment. In other words, while the exciting coil 11 is not energized, the movable body 13 and the holder 30 are retracted to the home position (shown in the lower half of the FIG. 9) by the magnetic force of the movable body 13, such that the forward end of the inner core 22a is in contact with the damper 31.

When said exciting coil 11 is energized by applying current in the direction indicated by the symbols, the inner pole 25a of said inner core 22a and the outer pole 25b of the outer core 22b are magnetized. Thus, said movable body 13 and the holder 30 are moved forward (to the position shown in the upper half of FIG. 9) by the magnetic repulsive force between the permanent magnet and the magic poles. It is possible to control as desired the rate displacement and the stop position of the movable body by varying the voltage applied.

What is claimed is:

1. A linear actuator capable of low-speed driving which comprises an electromagnetic unit which generates magnetic force in response to the amount of electric energy applied, a movable body which is displaced linearly by magnetic force as thrust force which is supplied from the electromagnetic unit, a spring means which applies a spring force to the movable body in the direction opposite to the direction of said thrust force, and a control apparatus which controls the amount of electric energy to be applied to said electromagnetic unit, wherein said electromagnetic unit consists of a core and an exciting coil, said core having a columnar inner core forming an inner pole, an outer core forming an outer pole surrounding said inner core, and a space formed between the two cores, said exciting coil being arranged in the space of said core core and around said inner core; the movable body consists of an annular permanent magnet having radially magnetized N-pole and S-pole and is so arranged as to be displaced freely in the space of said core in the axial direction of said core; said spring means is a magnetic spring attributable to magnetic force existing between said permanent magnet and the core; and said control apparatus is so constructed as to control the rate of displacement of said movable body in response to the amount of electric energy applied, with voltage or current applied to said exciting coil varying from that which generates a thrust force balancing with said spring force.

2. The linear actuator as defined in claim 1, in which said movable body is held by a non-magnetic holder.

* * * * *